Dec. 15, 1925.　　　　　　　　　　　　　　　　　　　　1,565,624
R. CHILTON
DETACHABLE SUBFRAME FOR VEHICLES
Filed Aug. 11, 1924　　　2 Sheets-Sheet 1
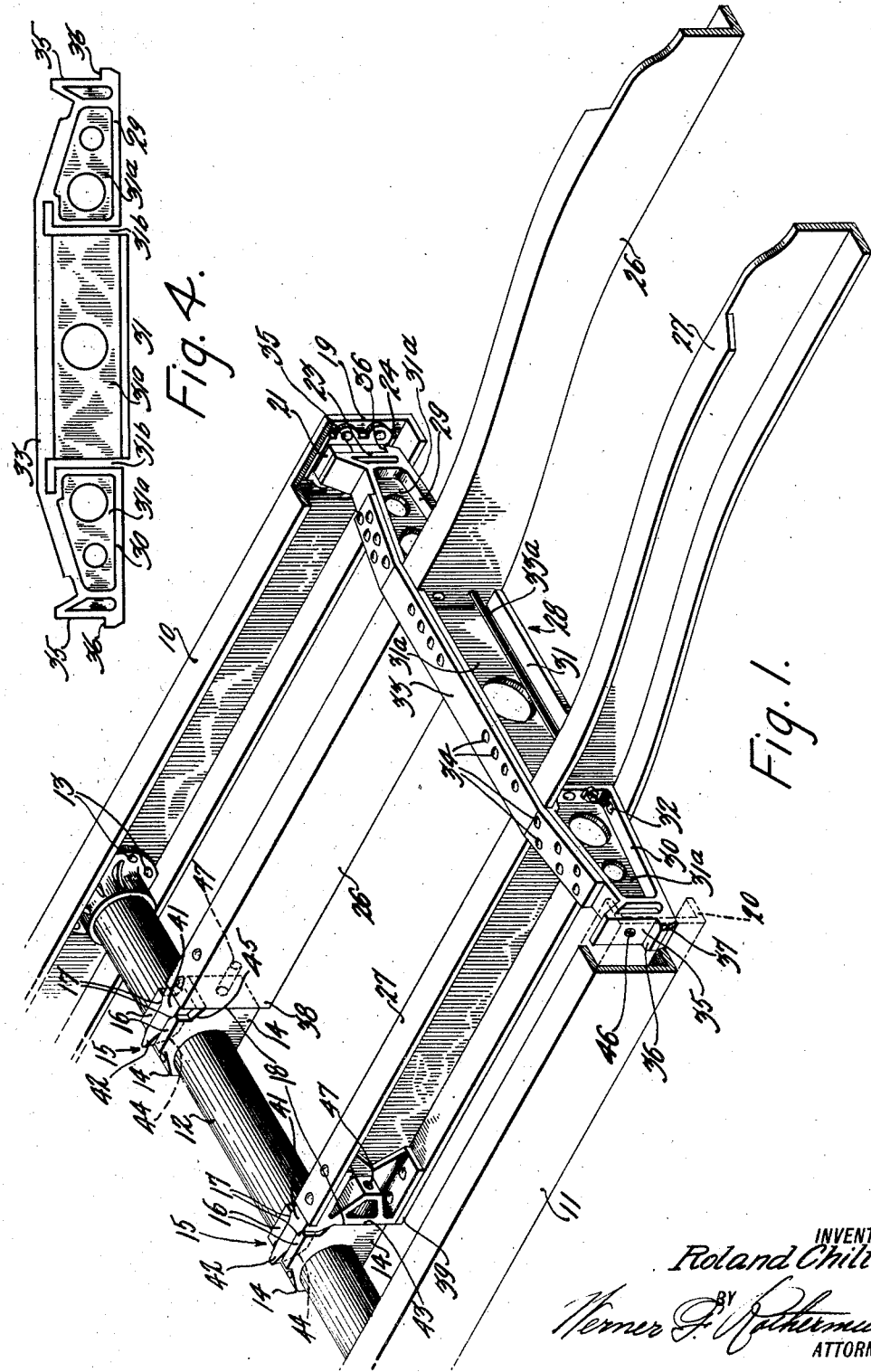
INVENTOR
Roland Chilton
BY
Werner F. Rothermund
ATTORNEY

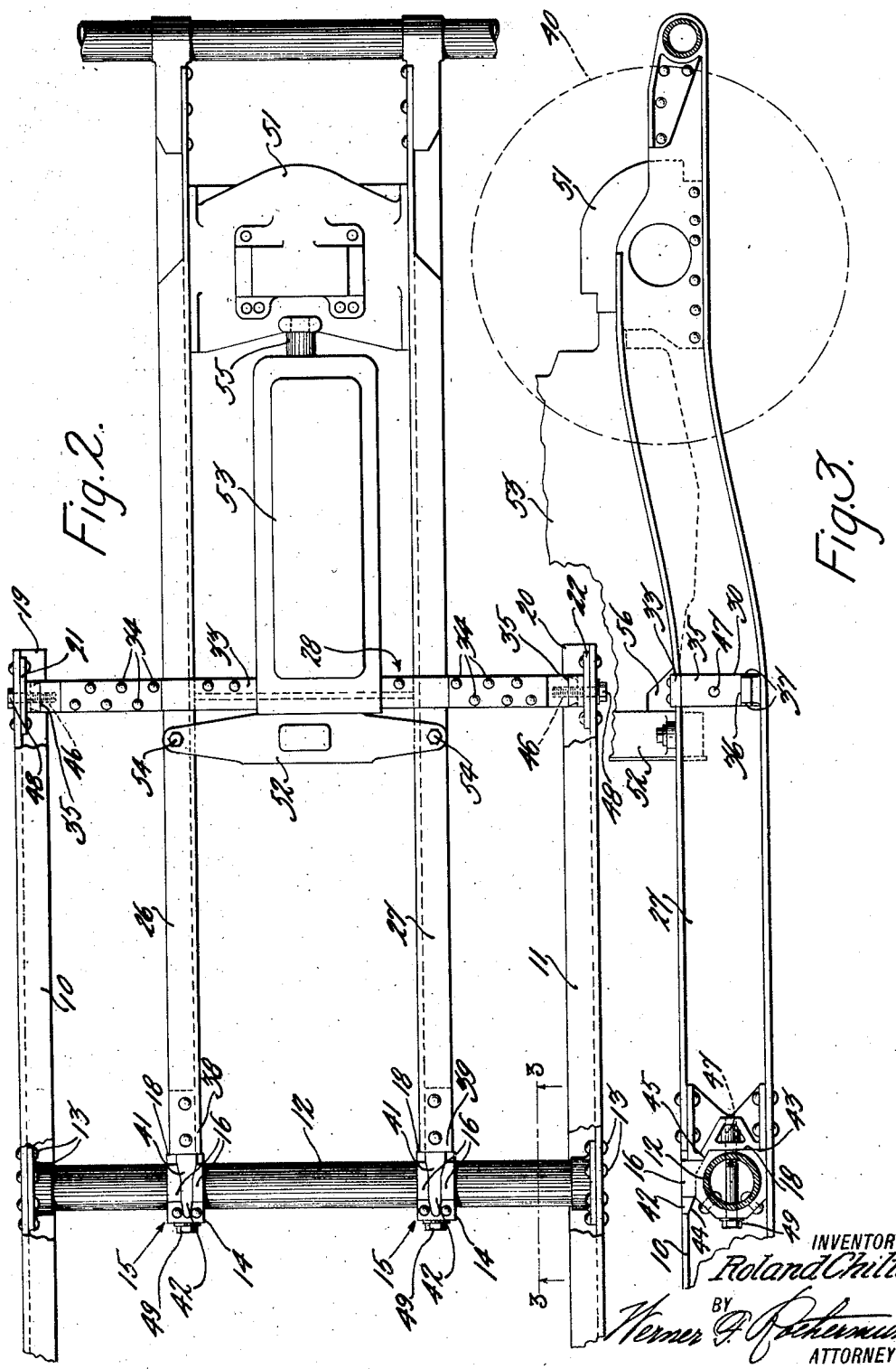

Patented Dec. 15, 1925.

1,565,624

UNITED STATES PATENT OFFICE.

ROLAND CHILTON, OF KEYPORT, NEW JERSEY, ASSIGNOR TO AEROMARINE PLANE AND MOTOR COMPANY, INC., A CORPORATION OF NEW YORK.

DETACHABLE SUBFRAME FOR VEHICLES.

Application filed August 11, 1924. Serial No. 731,373.

*To all whom it may concern:*

Be it known that I, ROLAND CHILTON, a subject of the King of England, and a resident of Keyport, in the county of Monmouth and State of New Jersey, have invented certain new and useful Improvements in Detachable Subframes for Vehicles, of which the following is a specification, reference being had to the accompanying drawings, forming part of this specification.

This invention relates to an improved subframe for carrying the power plant and transmission units of a vehicle, for quick detachment, and aims at providing new and improved structure for obtaining the narrowing in the width at the forward end of the frame such as is necessary on most road vehicles.

The present showing indicates a relatively narrow sub-frame for the purpose of affording clearance for a large front wheel steering angle and a relatively wide main frame suited to large body capacity. The side members of the sub-frame and the main frame are both preferably straight and parallel in plan aspect and are made to lap each other so that a considerable portion of the rear of the sub-frame lies between the forward portion of the main frame side members. The main frame is provided with a cross member adapted to engage the rear ends of the sub-frame while the sub-frame is provided with a cross member extending laterally to engage the front ends of the main frame.

The front end of the vehicle is supported by the front wheels, which are attached to the sub-frame, whence it will be seen that the end of the main frame bears downwardly relative to the end of the sub-frame cross member, whilst the end of the sub-frame bears downwardly on the main frame cross member.

One of the objects of the invention is to provide quickly severable but rigid connections between the sub-frame and the main frame, and to this end the connections are provided with shelves or abutments adapted to support the loads at each point. Thus an upwardly facing shelf or lip on each extension of the sub-frame cross member engages the under-side of a suitable block in each main frame member, whilst a projection at the rear of the sub-frame rests upon an engaging face in the main frame cross member. These faces therefore support the loads independently of the detachable fastening means which prevent separation in a horizontal direction, which is the unloaded direction as regards the weight of the vehicle and its load.

The sub-frame withdraws from the main frame by movement forwardly along the longitudinal axis of the vehicle and to avoid the necessity for careful alignment during the process of reassembly, the entering ends of the projections on the sub-frame are pointed. Side motion of this projection is prevented by an engagement between suitable projections on the main frame cross member, which projections are conveniently chamfered to coact with the pointed end to guide the same into correct assembled position. In a similar way chamfers are provided to afford a tapered entrance for the ends of the sub-frame cross member between the engaging blocks at the end of the main frame. Thus the sub-frame is guided into correct position, when backed into the main frame for assembly, accurate manual adjustment for this operation being unnecessary.

The fitting at the end of the sub-frame is provided with a vertical face engaging a corresponding face on the main frame cross member and a draw bolt passing through a hole in the cross member with an ample clearance maintains the parts in rigid assembled relationship. The extended ends of the sub-frame cross member have similar vertical faces which are also drawn against corresponding faces on the main frame by a draw bolt at each connection.

It will be seen that the four bolts which secure the frame connections are independent of chassis load which is taken by solid abutments in each case, thus the bolts may be withdrawn with the full load on the chassis while ample clearance can be provided in the bolt holes thus preventing difficulty due to possible distortion of the parts.

It will be noted that in disassembled relation the over-lapping ends of the sub-frame and the main frame are relatively flexible sidewise so that the parts will not be strained when the vertical faces are pulled up into accurate contact by the draw bolts, even though inaccuracies in manufacture or distortions due to use should develop. In the same way, when the bolts are withdrawn there are no tightly fitted parts such as could cause difficult disassembly.

In the structure featured the bending moments on the cross members are relatively large, especially on the sub-frame cross member, which extends to a considerable distance on either side of the sub-frame members. This cross member cannot be conveniently placed above or below the sub-frame and a special construction is here featured so that the extended ends of the cross member are adequately connected in such a way as not to reduce the strength of the sub-frame members. As before stated, the load at the extended ends of the sub-frame cross member are downwards and hence the top element of this member is in tension. This element in the specific built-up cross member of the showing takes the form of a flat strip laid down across the top of the sub-frame side members and suitably secured to the extending arms of the cross member structure. The lower side of the cross member structure is in compression which is taken, intermediate of the side frames, by a member which is conveniently made of channel section. A through-bolt engaging the extending arm members towards the bottom of the sub-frame members ties the parts together against movement under possible reversed loads. This, in conjunction with the securing of the top flange of the channel member to the upper or tension member, adequately resists the shearing or lateral forces. It will be seen from the foregoing that without materially increasing the height of the sub-frame, extending arms of relatively great strength have been provided.

The main frame cross member does not cross the side members which it connects and a continuous member of conveniently tubular section is accordingly shown.

Various other objects and advantages of the invention will be in part apparent from an inspection of the accompanying drawings and in part will be more fully set forth in the following particular description of one form embodying my invention, and the invention also consists in certain new and novel features of construction and combination of parts hereinafter set forth and claimed.

In the drawings:—

Figure 1 is a perspective view of the invention and illustrates a vehicle main frame having a sub-frame connected thereto in the improved manner.

Figure 2 is a plan view of the same and in which there is shown power plant and transmission units supported thereon.

Figure 3 is a side elevation of Fig. 2 partly in section, the section being taken on the line 3—3 of Fig. 2 and as looking in the direction indicated by the arrows.

Figure 4 diagrammatically illustrates the sub-frame cross member in elevation.

In the present instance 10 and 11 designate two main frame members preferably disposed parallel to one another on which the vehicle is supported. A cross tube 12 separates these members and is rigidly secured thereto in any suitable manner as by the rivets 13.

Rigidly secured to the tube 12 in spaced apart relation are a pair of blocks 14 each of which constitute one element of a coupling 15. These blocks are provided with upwardly extending guides 16 the corners of which are chamfered or beveled as at 17, and flat vertical faces are formed thereon as at 18.

Adjacent the ends 19, 20 of the main frame members 10 and 11 there are secured a further pair of blocks 21, 22 one for each frame member. These blocks also have a flat vertical face 23 in addition to which there has been provided an under flat horizontal face 24.

In will be seen in the drawings that the cross tube 12 is located at a substantial distance away from the ends 19, 20 of the main frame, and that it supports one end of the sub-frame.

The sub-frame comprises a pair of side members 26, 27 provided with upper and lower flanges and rigidly secured together remote from the ends by a cross member 28. This cross member 28 which is one of the features of the present invention comprises an upper or tension element 33 forming a flange, and lower or compression elements 29, 30 and 31 also forming a flange and connected with the upper tension element by the web portions 31ª. Suitable openings 31ᵇ (Fig. 4) are provided in the web portions for the reception of the side members 26, 27. The elements forming the cross member 28 may be joined together in any suitable manner as for instance by casting the entire cross member assemblage in one piece. In the showing of Fig. 1, however, the tension element 33 is composed of a flat strip of substantial thickness and secured to the web portions 31ª by rivets 34. The portions 29, 30 of the compression element together with portions of the upper or tension element and their connecting web portions are adapted to extend laterally on either side of the side members 26, 27 and form the support for the main frame members 10, 11. These laterally extending portions are provided with a flat vertical face 35 and an upwardly disposed horizontal face 36 which form abutments and which are adapted to engage the aforesaid faces 23, 24 of the blocks 21, 22 for the support of the main frame. The corners have been chamfered as at 37 to facilitate the introduction of these parts.

In the showing of Fig. 4 which diagrammatically illustrates the essential elements of the cross member 28 it will be seen that the compression elements 29, 30 and 31 are interrupted by the openings 31$^b$. It will be understood, however, that when this cross member 28 is secured to the side members 26, 27 the compression elements will in effect be continuous. It will be further understood that when the load is applied to the ends of the laterally extending portions 29, 30 these elements together with the portion 31 will be under compression and the upper element 33 will be subject to tension. A through-bolt 33$^a$ engages the elements 29, 30 towards the lower portion of the frame and ties the parts together against movement under possible reversed loads.

It will be seen that the sub-frame members 26, 27 have been spaced apart so as to lie between the main frame members 10, 11 and also that they are in alignment with the blocks 14 on the cross tube 12. This spacing provides a relatively narrow forward structure adapted to afford clearance for the steering of the front wheels 40 which are mounted at the forward end thereof.

Secured to the ends 38, 39 of the sub-frame in any suitable manner are the second elements 41 of the coupling 15, said elements 41 being provided with pointed projections 42 adapted to rest on the blocks 14 and restrained from lateral movement thereon by the guides 16.

These coupling elements 41 are also provided with flat vertical faces 43 to engage the faces 18 of the blocks 14 and the projections 42 are beveled at 44 so as to co-act with similarly beveled portions 45 on the blocks when the sub-frame is longitudinally moved into position.

Horizontally tapped holes 46 are provided in the end of the supporting members 29, 30 and further tapped holes 47 are provided in the elements 41 of the coupling 15 to receive the draw bolts 48 and 49 which pass through clearance holes in the main frame members at the sides and the blocks 14 at the rear respectively.

With reference to Figs. 2 and 3 there is shown the manner in which the power plant and transmission units are supported on the sub-frame. A gear housing 51 is secured to and supported between the two frame members 26, 27 and a bell housing 52 secured to the motor 53 is supported on the frame members as shown and attached thereto by the bolts 54. A nose 55 of the motor engages the gear housing 51. The form of the conventional type of motor usually provides a clearance at 56 which is efficiently utilized in the present instance for the disposition of the cross member 28. Variations may be resorted to within the scope of the invention and portions of the improvements may be used without the others.

Having thus described my invention, I claim:—

1. In a detachable power plant supporting unit for a vehicle the combination of, a relatively wide vehicle main frame terminating behind the front wheels of the vehicle so as to afford clearance for the steering thereof, a relatively narrow power plant frame, each frame including two side members spaced apart, the power plant side members spaced less than the main frame side members, a cross member rigid with the vehicle frame and spaced from the ends thereof and adapted for engagement by the ends of the power plant frame and a cross member rigid with the power plant frame and intermediate the ends thereof and extended to detachably engage the ends of the vehicle frame.

2. In a vehicle frame, the combination of spaced apart longitudinal side members, sub-frame members substantially parallel to the side members and disposed for a part of their length between the side members in widely spaced relation, a cross member rigid with the sub-frame members and extending laterally therefrom to detachably engage the side members adjacent their ends, and a cross member adapted to detachably engage and support the ends of the sub-frame and to rigidly connect the frame side members.

3. The combination with a vehicle main frame, of a detachable sub-frame adapted to form a relatively narrow frame extension comprising a pair of longitudinal members spaced apart substantially less than the width of the vehicle frame to afford a turning space for wheels on either side, a cross member rigid with the vehicle frame, a rigid cross member disposed intermediate the ends of the sub-frame and extending laterally therefrom to engage the main frame members adjacent their ends, and means at an end of each longitudinal member for engaging the cross member secured to the vehicle frame.

4. In a vehicle the combination with a pair of main frame longitudinal members, of a pair of longitudinals constituting a separable sub-frame forming a relatively narrow extension to the main frame to permit steering of the wheels to extreme angles, a cross member rigid with the main frame members to support the rear ends of the sub-frame, a laterally extending cross member rigid with the sub-frame longitudinals and disposed at the ends of the main frame, means on the main frame cross member to detachably engage the ends of the sub-frame members, and means on the main frame members to detachably engage the sub-frame cross member.

5. In a vehicle frame, in combination, a cross member, a pair of main longitudinal members spaced apart by the cross member and, a sub-frame cross member, a pair of sub-frame longitudinal members spaced apart by the cross member to lie between the main frame side members in spaced relation thereto, the sub-frame cross member laterally extending at the rear of the road wheels and engaging the main frame longitudinals adjacent their ends, and means at an end of the sub-frame longitudinals for engaging the main frame cross member.

6. The combination of a vehicle frame having a pair of longitudinal members terminating at the rear of the road wheels to avoid steering interference and connected by a cross member, an extension constituting a sub-frame comprising a pair of longitudinals adapted in assembled relation to lie between the main frame longitudinals in widely spaced relation therefrom and to engage at their ends the main frame cross member, and a cross member rigid with said sub-frame longitudinals and extended on each side to engage the ends of the main frame.

7. In apparatus of the class described, the combination of, a pair of main frame longitudinal members adapted to be supported upon the wheels, a cross member secured between the longitudinals remote from their ends, a pair of sub-frame longitudinal members supported upon wheels and spaced apart from the main frame longitudinals, a cross member secured to the sub-frame longitudinals intermediate their ends and laterally extended behind the wheels towards the main frame longitudinals, an upwardly facing abutment on the ends of the sub-frame cross member to support the ends of the main frame members, a downwardly facing abutment at the ends of the sub-frame, means on the main frame cross member adapted to engage said abutment for the support of the sub-frame.

8. In a separable vehicle frame, the combination of a main frame having two side members spaced apart in fixed relation, a sub-frame having two side members spaced apart in fixed relation and having rear ends unrestricted against relative lateral deflection; said sub-frame adapted to be longitudinally moved into position between the main frame members, coupling means rigid with the main frame, guiding elements on the coupling means adapted to receive the rear ends of the sub-frame for the rigid support thereof, means rigid with the sub-frame and extending laterally thereof to engage the main frame for the support thereof, and detachable means at said engaging points to hold said frames in assembled relation.

9. In apparatus of the class described, the combination of a main frame having side members adapted to be partly supported upon wheels, a sub-frame partly supported upon steerable wheels, said sub-frame relatively narrow to permit steering movement of its wheels to extreme angles, the ends of the sub-frame to the rear of the steerable wheels being disposed between the main frame side members, demountable coupling means on the main frame having guiding elements for the reception and support of the sub-frame ends, demountable coupling means on the sub-frame for the support of the main frame ends, and means to prevent the separation of said couplings.

10. In a vehicle, the combination of a pair of spaced apart longitudinal main frame members adapted to be supported upon wheels, a sub-frame including a pair of members spaced apart and supported upon steerable wheels, transversely disposed tie members for both the main frame and the sub-frame, the sub-frame members spaced from and partly disposed between the main frame members and extending beyond the ends thereof in a manner as to prevent wheel steering interference with the main frame, the inner ends of the sub-frame adapted to be engaged and supported on the main frame tie member, laterally extending portions on the sub-frame tie member adapted to engage and support the ends of the main frame, and means adapted to secure the main frame and the sub-frame in assembled relation.

11. In a vehicle frame, the combination of a main frame having a pair of longitudinal members, a sub-frame therebetween, a cross member on the main frame, means on the cross member adapted to be engaged by the ends of the sub-frame, a cross member for the sub-frame laterally extending therebeyond to engage the ends of the main frame, and means comprising draw bolts to hold said engaging means in fixed relation.

12. In a separable vehicle frame, the combination of a main frame comprising spaced apart longitudinal side members, a cross member rigidly connecting said side members, a sub-frame comprising side members spaced apart and adapted to be disposed between the main frame side members, a tie means rigidly connecting the sub-frame members, laterally extending members secured on either side of the sub-frame, said members aligned with the tie means and with the ends of the main frame, coupling means adapted to support the ends of the sub-frame on the cross member said coupling means comprising members attached to the ends of the sub-frame and the cross member respectively, further coupling means comprising members secured to the ends of the main frame and adapted to be engaged by said laterally extending members for the support of the main frame ends thereon, and means to prevent separation of the couplings aforesaid.

13. In apparatus of the class described, a pair of main frame side members, a sub-frame disposed between and extending beyond said main frame members, a sub-frame end supporting cross member rigid with the main frame, a main frame end supporting cross member rigid with the sub-frame, the last said cross member extending across the sub-frame members at the end of the main frame, and interlocking connections on said main frame and sub-frame.

14. In apparatus of the class described, a pair of main frame side members, a sub-frame disposed therebetween constituting a relatively narrow forward extension beyond said main frame members, a sub-frame end supporting cross member rigid with the main frame, a main frame supporting cross member rigid with the sub-frame and extending therebeyond to engage the ends of the main frame, and demountable connections at the points of supports set forth adapted for the quick separation of the parts.

15. In apparatus of the class described, the combination of a main frame comprising a pair of side members adapted to be supported upon wheels, a sub-frame having side members partly supported upon steerable wheels and disposed between the main frame members in spaced relation, said sub-frame members extending forwardly beyond the main frame, a cross member rigid with the main frame and adapted to engage and support the rear end of the sub-frame, a cross member rigid with the sub-frame and extending laterally therebeyond to the rear of the steerable wheels to engage the forward ends of the main frame members, and coacting horizontal faces at the points of engagement for the support of the vehicle upon said frames in their assembled relation.

16. In apparatus of the class described, the combination of a main frame comprising side members, a sub-frame having side members disposed between and extending forwardly beyond the ends of the main frame, a cross member rigid with the main frame and supporting the inner ends of the sub-frame, a cross member rigid with the sub-frame and extending laterally therefrom to engage the ends of the main frame said cross member comprising an upper tension element crossing the side members, a lower compression element, and web portions extended between and beyond the side members and uniting said elements to form an extended load supporting girder.

17. In apparatus of the class described, the combination of, a main frame, a sub-frame, a rigid cross member for each frame constituting the supporting means for the ends of the other frame, the main frame cross member including guiding elements adapted to receive and support the ends of the sub-frame, the sub-frame cross member including an upper flange forming a tension element and extending across the upper portion of the side members, a lower flange forming a compression element, web portions connecting said tension and compression elements, and means at the ends of said cross member to engage and support the ends of the main frame.

18. In a vehicle, the combination of a sub-frame having a pair of side members, a cross member connecting the side members intermediate their ends and extending laterally therefrom on either side, engaging means at one of the ends of each side member, a main frame comprising a pair of side members having engaging means at their ends and connected by a cross member, a pair of blocks secured to the main frame cross member, said blocks having guiding means adapted to receive and locate the engaging means of the sub-frame when moved into position between the main frame side members, the laterally extending portions of the sub-frame cross member being adapted to co-act with the engaging means at the ends of the main frame side members in forming a rigid connection, and means to maintain the points of engagements between the sub-frame and the main frame in fixed relation.

19. The combination with a vehicle having a supporting main frame, of a sub-frame having spaced apart side members, a cross member for connecting the sub-frame with the main frame comprising a tension element laid across the side members and extending therebetween, a compression element disposed between the side members and secured to the tension member in restraint of shearing distortion in combination with extension members secured to the extended ends of the tension member and to the outside of the side members.

20. The combination of a sub-frame having a pair of spaced-apart longitudinals, a vehicle main frame having a pair of relatively wider spaced apart longitudinals, a cross member having upper and lower flanges connected to form a girder and extending beyond the sub-frame longitudinals to the main frame longitudinals the upper flange of the cross member being laid across the upper surface of the longitudinals whereby the depth of the complete structure shall not exceed the depth of the sub-frame longitudinals by more than the thickness of the flanges.

Signed at Keyport, in the county of Monmouth and State of New Jersey this 8th day of August A. D., 1924.

ROLAND CHILTON.